July 12, 1927.  
E. K. SCHADT  
1,635,225  
LENS  
Original Filed June 7, 1924
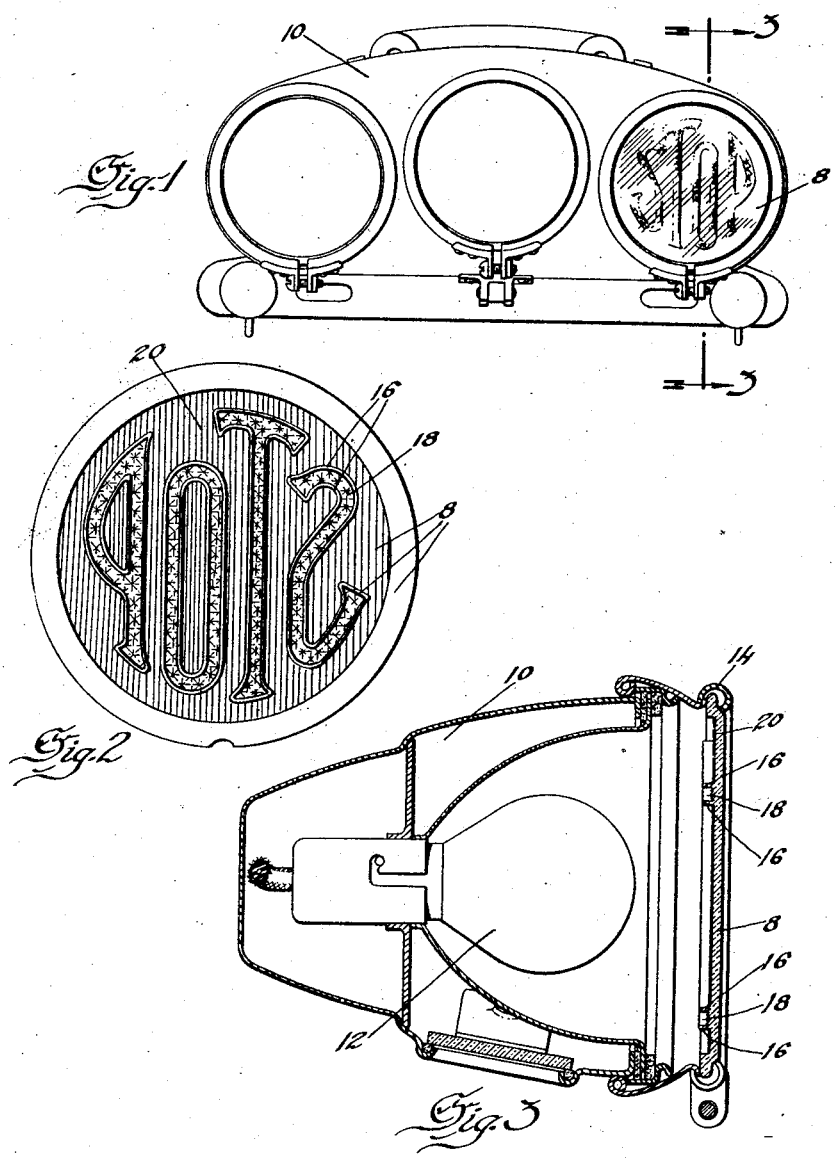
Inventor  
Ewald K. Schadt  
By his Attorneys  
Blackmore, Spencer & Fleit Patented July 12, 1927.

1,635,225

UNITED STATES PATENT OFFICE.

EWALD K. SCHADT, OF DETROIT, MICHIGAN, ASSIGNOR TO GENERAL MOTORS CORPORATION, OF DETROIT, MICHIGAN, A CORPORATION OF DELAWARE.

LENS.

Application filed June 7, 1924, Serial No. 718,532. Renewed May 14, 1927.

This invention relates to lamps, and is illustrated as embodied in an automobile "stop" light. In certain lenses used with such lights, the letters of the word "Stop", or some equivalent warning, are blocked out by opaque material on the front face of the lens, or in some cases this material is on the rear of the lens and the front is covered with small pyramids or other light-refracting formations. In either case cleaning of the lens is interfered with; in the first case thorough cleaning is apt to remove some of the opaque material, and in the second case the pyramidal formations catch and quickly become clogged with mud and dust.

An object of the invention is to provide a lens which is easily cleaned without danger of damage. In one preferred arrangement the front face is entirely smooth, and the opaque material is on the back, where it is confined in such a manner as to outline the letters. It is desirable also to provide small pyramids, or other light-refracting formations, on the rear face of the lens in the space not blocked out by the opaque material.

The above and other objects and features of the invention will be apparent from the following description of an illustrative embodiment shown in the accompanying drawings, in which:

Figure 1 is a front elevation of a set of Cadillac lamps,—i. e. looking from the rear of the car, but toward the front face of each lens;

Figure 2 is a rear elevation of the lens; and

Figure 3 is a section on the line 3—3 of Figure 1, showing the lens and its mounting with relation to the source of light.

The novel lens 8 described above is shown arranged in the rear lamp housing 10 of a Cadillac automobile, in front of a light 12 which is ordinarily controlled by a switch operated by depression of the brake pedal. The lens itself is held by a bezel 14.

According to the present invention the lens 8 is arranged with a smooth front face directed outwardly, so that there is nothing to interfere in any way with cleaning. On the inside there is a plurality of sets of parallel ridges 16, usually outlining letters such as "S-T-O-P". Preferably the space included in these letters is covered with small pyramids or other light-refracting formations 18. The remainder of the lens is blocked out with opaque material 20, which is flowed over the entire back of the lens except where it is restrained or dammed back by the ridges 16. Thus not only is the opaque material on the inside where it is protected, but also all rough or projecting parts are on the inside where they will not collect mud and dirt.

While one illustrative embodiment of the invention has been described in detail, it is not the intention to limit its scope to that particular embodiment, or otherwise than by the terms of the appended claims.

I claim:

1. A lamp comprising, in combination, a casing, a source of light in the casing, and a glass lens which has a smooth outer face, a plurality of sets of parallel ridges outlining letters on its inner face, light-refracting parts between the pairs of ridges, and opaque material flowed over the entire rear or inner face of the lens except where dammed back by said ridges from covering the letters.

2. A lamp comprising, in combination, a casing, a source of light in the casing, a lens for the casing having a smooth outer face, characters upon the inner surface of said lens, each of said characters being defined by a peripheral ridge or ridges, the portions of the inner surface thereof lying within said ridges being formed to provide light-refracting parts.

3. In the combination as defined by claim 2, the portion of the inner surface of the lens outside of said ridges having a coating of opaque material flowed thereon.

4. A lamp comprising, in combination, a casing, a source of light in the casing, and a lens for the casing having a smooth outer face, characters upon the inner face of the lens, each of said characters being defined by a peripheral ridge or ridges, the portion of the inner surface of the lens outside of said ridges having a coating of light modifying material flowed thereon.

In testimony whereof I affix my signature.

E. K. SCHADT.